US008892580B2

(12) United States Patent
Syrowitz et al.

(10) Patent No.: US 8,892,580 B2
(45) Date of Patent: Nov. 18, 2014

(54) TRANSFORMATION OF REGULAR EXPRESSIONS

(75) Inventors: Clinton Syrowitz, Bellevue, WA (US); Mauktik Gandhi, Redmond, WA (US); Ashish Mishra, Seattle, WA (US); Manivannan Sundaram, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 86 days.

(21) Appl. No.: 13/359,975

(22) Filed: Jan. 27, 2012

(65) Prior Publication Data

US 2012/0124064 A1    May 17, 2012

Related U.S. Application Data

(63) Continuation-in-part of application No. 12/938,895, filed on Nov. 3, 2010, now abandoned.

(51) Int. Cl.
*G06F 17/00* (2006.01)
*G06F 17/30* (2006.01)

(52) U.S. Cl.
CPC ................................ *G06F 17/30985* (2013.01)
USPC ............ 707/756; 707/736; 707/758; 706/12; 706/14; 726/22; 726/26; 709/223

(58) Field of Classification Search
None
See application file for complete search history.

(56) References Cited

U.S. PATENT DOCUMENTS

| | | | |
|---|---|---|---|
| 7,685,271 B1 | 3/2010 | Schneider et al. | |
| 7,779,049 B1* | 8/2010 | Phillips | 707/809 |
| 7,916,510 B1* | 3/2011 | Starovoitov et al. | 365/49.1 |
| 7,945,528 B2 | 5/2011 | Cytron et al. | |
| 8,413,124 B2* | 4/2013 | Wang | 717/143 |
| 2002/0042794 A1* | 4/2002 | Konaka | 707/6 |
| 2002/0194172 A1* | 12/2002 | Schreiber | 707/4 |
| 2005/0278781 A1* | 12/2005 | Zhao et al. | 726/22 |
| 2006/0085389 A1* | 4/2006 | Flanagan et al. | 707/2 |
| 2009/0089278 A1* | 4/2009 | Poola et al. | 707/5 |
| 2009/0276506 A1* | 11/2009 | Tiwari et al. | 709/220 |
| 2010/0131935 A1* | 5/2010 | Wang | 717/143 |
| 2010/0174770 A1 | 7/2010 | Pandya | |
| 2011/0093496 A1* | 4/2011 | Bando et al. | 707/769 |
| 2011/0119440 A1 | 5/2011 | Pandya | |
| 2012/0005184 A1* | 1/2012 | Thilagar et al. | 707/706 |
| 2012/0240185 A1* | 9/2012 | Kapoor et al. | 726/1 |

OTHER PUBLICATIONS

Eguro, Ken, "Automated Dynamic Reconfiguration for High-Performance Regular Expression Searching", Retrieved at <<http://research.microsoft.com/pubs/141496/TechReport.pdf>>, International Conference on Field-Programmable Technology (FPT), Dec. 9, 2009, pp. 8.

(Continued)

*Primary Examiner* — Hung Le
(74) *Attorney, Agent, or Firm* — Louise Bowman; Brian Haslam; Micky Minhas

(57) ABSTRACT

Techniques to transform regular expressions are described. An apparatus may comprise a processor circuit and a key terms identifying module operative on the processor circuit to generate a set of one or more regular expression key terms from enabled features of a regular expression based on a set of configuration parameters, and filter one or more electronic messages using the set of regular expression key terms. Other embodiments are described and claimed.

20 Claims, 9 Drawing Sheets

(56) References Cited

OTHER PUBLICATIONS

Mat Nor, Hairul Anuar, "Improving Antispam Techniques by Embracing Pattern-based Filtering", Retrieved at <<http://eprints.utm.my/10003/1/HairulAnuarMatMFSKSM2009.pdf>>, Apr. 2009, pp. 87.

Lin, et al., "High-Speed Detection of Unsolicited Bulk Emails", Retrieved at <<http://www.cse.wustl.edu/ANCS/2007/papers/p175.pdf>>, Proceedings of the 3rd ACM/IEEE Symposium on Architecture for networking and communications systems (ANCS), Dec. 3-4, 2007, pp. 175-184.

Tseng, et al., "Deterministic High-Speed Root-Hashing Automaton Matching Coprocessor for Embedded Network Processor", Retrieved at <<http://140.113.88.160/~ydlin/deterministic_root_hashing.pdf>>, ACM SIGARCH Computer Architecture News, vol. 35, No. 3, Jun. 2007, pp. 36-43.

\* cited by examiner

TRANSFORMATION OF REGULAR EXPRESSIONS

RELATED CASE

This commonly owned application is a continuation-in-part of, and claims priority to, U.S. patent application Ser. No. 12/938,895 titled "Conditional Execution Of Regular Expressions" filed Nov. 3, 2010, the entirety of which is hereby incorporated by reference.

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, software applications may be designed to parse the text of documents, emails or other strings of characters. In such cases, regular expressions may be used to identify words, phrases or certain characters within the text. For instance, spam filters may use regular expressions to scan for certain words or phrases in email messages that are commonly associated with unwanted spam messages. In other cases, regular expressions may scan for strings of numbers or other characters. These regular expressions, however, may be very large and complicated. Processing these complicated regular expressions may consume considerable amounts of processing resources.

BRIEF SUMMARY

Embodiments described herein are directed to techniques to transform regular expressions. In one embodiment, for example, an apparatus may comprise a processor circuit and a key terms identifying module operative on the processor circuit to generate a set of one or more regular expression key terms from enabled features of a regular expression based on a set of configuration parameters, and filter one or more electronic messages using the set of regular expression key terms.

Embodiments are further described herein that are directed to conditionally executing regular expressions and to simplifying regular expressions by canonicalizing regular expression terms. In one embodiment, a computer system accesses identified regular expression key terms that are to appear in a selected portion of text. The regular expression key terms are identified from terms in a selected regular expression. The computer system determines whether the identified regular expression key terms appear in the selected portion of text. The computer system also, upon determining that none of the identified regular expression key terms appears in the selected portion of text, prevents execution of the regular expression. Upon determining that at least one of the identified regular expression key terms appears in the selected portion of text, the computer system executes the regular expression.

In another embodiment, a computer system accesses regular expression terms in a regular expression. The regular expression is configured for finding desired characters sets in a document. The computer system determines that some of the regular expression terms are to be canonicalized. Based on the determination, the computer system canonicalizes the regular expression terms, so that at least one previously uncanonicalized regular expression term is simplified into a single, canonicalized term.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the embodiments may be realized and obtained by means of the instruments and combinations particularly pointed out in the appended claims. Features of the present embodiments will become more fully apparent from the following description and appended claims, or may be learned by the practice of the embodiments as set forth hereinafter.

BRIEF DESCRIPTION OF THE DRAWINGS

To further clarify the above and other advantages and features of various embodiments, a more particular description of some embodiments will be rendered by reference to the appended drawings. It is appreciated that these drawings depict only typical embodiments and are therefore not to be considered limiting of its scope. The embodiments will be described and explained with additional specificity and detail through the use of the accompanying drawings in which.

DETAILED DESCRIPTION

Figure 1:
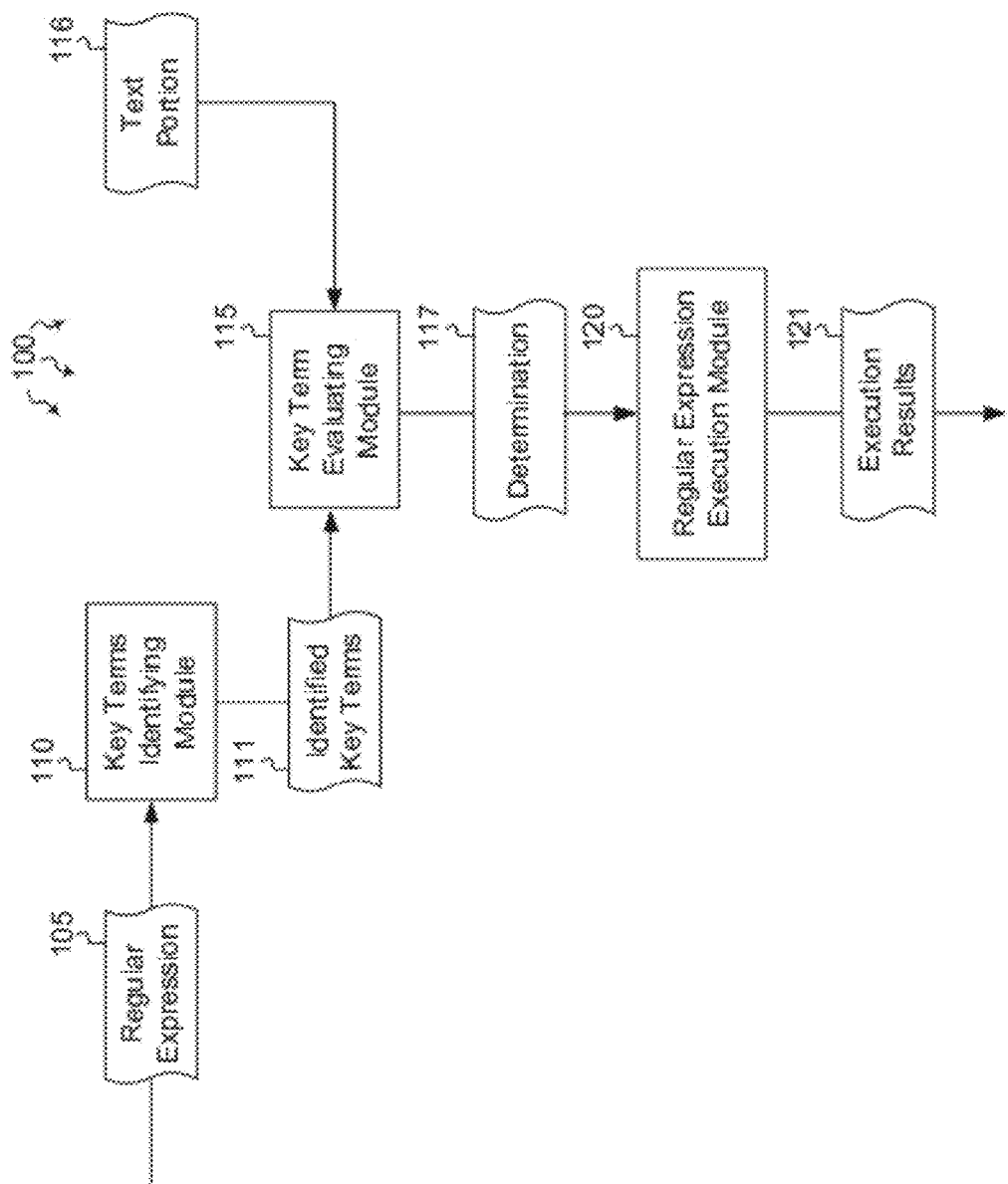
FIG. 1 illustrates a computer architecture in which embodiments may operate including conditionally executing regular expressions and simplifying regular expressions by canonicalizing regular expression terms.

Embodiments described herein are directed to techniques to transform regular expressions into keyword terms (and phrases) in a robust, efficient and effective manner. The resulting keyword terms may be used for any number of use scenarios. In one embodiment, for example, the keyword terms may be used for a given application, such as filtering of electronic messages. In one embodiment, for example, the keyword terms may be used for indexing complex regular expressions to facilitate searches. In one embodiment, for example, the keyword terms may be used to automatically build text based data sets for generating test data for various test scenarios, such as test email messages for testing an "anti-spam" filter. In one embodiment, for example, the keyword terms may be used to automatically and dynamically construct conditional regular expressions. In one embodiment, for example, the keyword terms may be used to automatically and dynamically generate recommendations to refine authoring of regular expressions. Other capabilities and uses for the keyword terms are described in more detail below.

Embodiments further described herein are directed to conditionally executing regular expressions and to simplifying regular expressions by canonicalizing regular expression terms. In one embodiment, a computer system accesses identified regular expression key terms that are to appear in a selected portion of text. The regular expression key terms are identified from terms in a selected regular expression. The computer system determines whether the identified regular expression key terms appear in the selected portion of text. The computer system also, upon determining that none of the identified regular expression key terms appears in the selected portion of text, prevents execution of the regular expression. Upon determining that at least one of the identified regular expression key terms appears in the selected portion of text, the computer system executes the regular expression.

In another embodiment, a computer system accesses regular expression terms in a regular expression. The regular expression is configured for finding desired characters sets in a document. The computer system determines that some of the regular expression terms are to be canonicalized. Based on the determination, the computer system canonicalizes the regular expression terms, so that at least one previously uncanonicalized regular expression term is simplified into a single, canonicalized term.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments may comprise or utilize a special purpose or general-purpose computer including computer hardware, such as, for example, one or more processors and system memory, as discussed in greater detail below. Embodiments may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media. Computer-readable media that carry computer-executable instructions are transmission media. Thus, by way of example, and not limitation, embodiments can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates a computer architecture 100 in which the principles of the present embodiments may be employed. Computer architecture 100 includes regular expression 105. As used herein, the term regular expression refers to terms, symbols, special characters, words, phrases or other sequences of characters that are used to identify other terms, phrases, words, numbers or other characters in a block of text. For instance, a regular expression may include certain characters that are designed to look for important information such as credit card numbers, social security numbers, names and addresses and other personal information. Such regular expressions may be implemented to assist in data leakage prevention programs that prevent users from sending such personal information in open text emails or other documents.

Regular expressions (e.g. 105) may include substantially any number of terms or special characters. Key terms identifying module 110 may be used to identify one or more regular expression key terms 111 in the regular expression. Key terms, as used herein, may include regular expression terms that are fundamental to that regular expression. In other words, without that key term or terms, the regular expression will not match and the rest of the regular expression does not need to be applied. Accordingly, in the example mentioned above, if a regular expression is designed to look for "Credit Card" (e.g. "Credit Card:.*?\d{16}" with key term {"Credit Card"}), if the word "Credit Card" was not found in the text, the regular expression would not match. Moreover, because the regular expression did not match, the text would not need to be searched for the other information.

Key term evaluating module 115 may access text portion 116, which may be an email, document, web page or any other file or item that includes text. Module 115 may evaluate the text portion to determine whether it has any of the regular expression key terms 111 of the regular expression that is being used (105). Determination 117 indicates that the identified key terms were either present in the text portion, or were not present in the text portion. Based on this determination, regular expression execution module 120 may either prevent execution in cases where the key terms were not present in the text portion, or may initiate execution in cases where the key terms were present in the text portion. In cases where the regular expression was executed, the execution results 121 may be sent to a user, computer system, software application or other entity.

Figure 4:
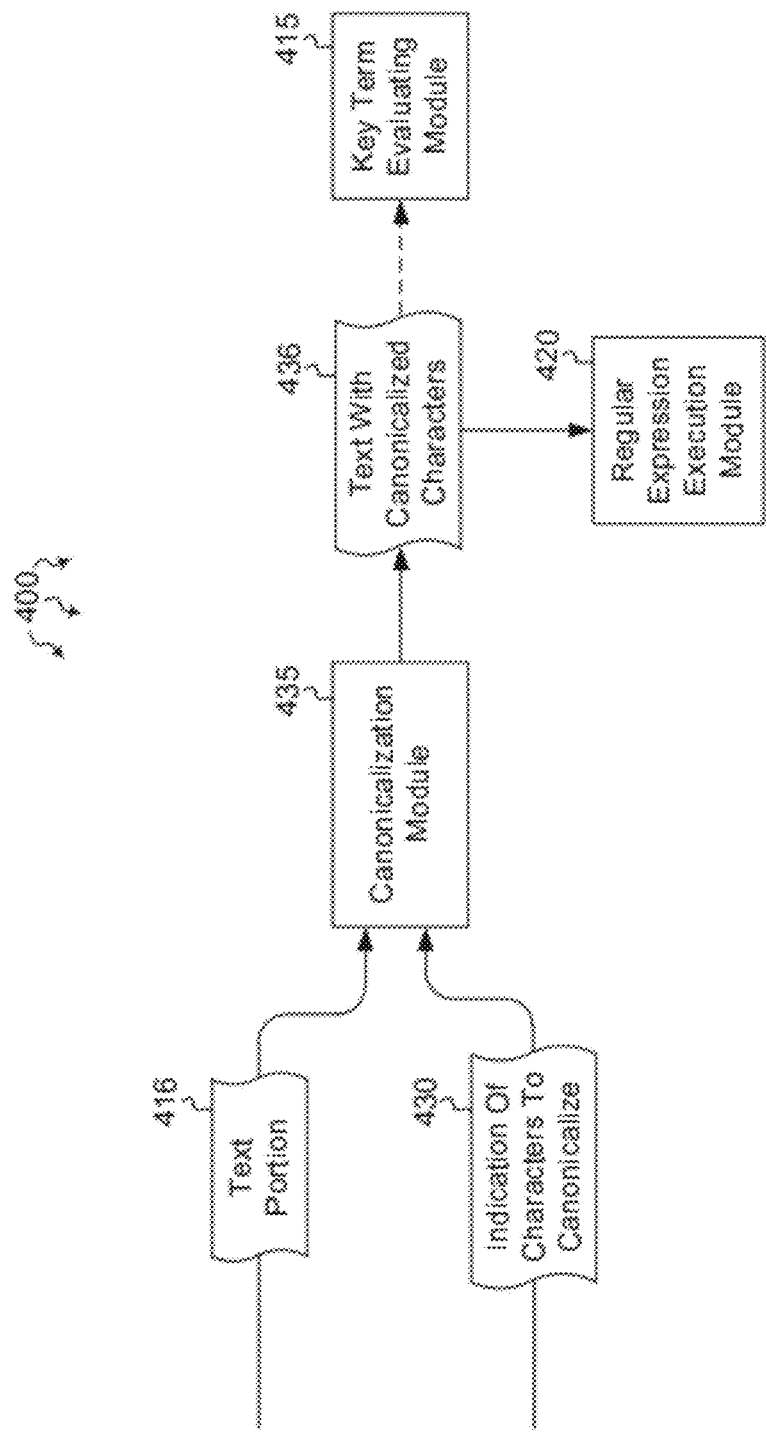
FIG. 4 illustrates a computer architecture in which text is canonicalized and implemented in regular expressions.

FIG. 4 includes a canonicalization module 435. The term "canonicalize," as used herein, refers to identifying a set of characters and converting those characters to a single character during text processing. For instance, in one embodiment, any Arabic number (0-9) may be treated as (or converted to) a 0. Thus, in the credit card example above, the regular expression would not need to match certain specific strings of numbers, but rather sixteen sequential zeros which represent each number 0-9. Many other implementations of canonicalization may be used, and this example should not be read as limiting the types of canonicalization that are possible.

Canonicalization module 435 may access a portion of text 416 and an indication of characters that are to be canonicalized 430. This indication may be received from a user, computer system, software application or other entity. Based on the indication, module 435 may canonicalize the characters as instructed and output the text with canonicalized characters 436. This text with canonicalized characters may be sent to the key term evaluating module 415 to determine whether the text includes any of the identified key terms. Additionally or alternatively, the text with canonicalized characters may be sent to regular expression execution module 420 to be analyzed by a regular expression.

In this manner, regular expressions may be statically analyzed to extract key terms, and then conditionally executed if those key terms are present. This enables very complex regular expressions to be used. As long as part of the regular expression may be found to require any of a set of key terms to match, the rest of the regular expression may be highly sophisticated. This allows existing corpuses of regular expressions to be used, some of which may be very complex.

Preprocessing of regular expressions may be used to generate a conditional regular expression. In some cases, preprocessing may be performed once on each regular expression in the corpus. The results may be saved and then consumed during the execution stage. Preprocessing is designed to extract terms from a regular expression, in order to speed up the execution stage. Canonicalization may be performed during preprocessing.

In some embodiments, alternation or operators which may result in multiple matches result in multiple generated terms. For instance, "this|that" results in the terms 'this' and 'that'. If an operator cannot be turned into a term (or would result in too many terms), groups of terms may be created. For example, "this \w* that" may result in the term group {'this', 'that'} (\w* does not generate any finite set of terms). Groups may be parsed separately, and then merged with the remaining results. For instance, "Test (stuff|data) text" results in {'stuff', data'} being produced from the contained group, then being merged into the parent group, to produce { 'Test stuff text', 'Test data text'}.

The following examples are for illustration purposes only and should not be read as limiting the scope of the embodiments. In these examples, the following terminology will apply: Given n regular expressions and $i|0 \le i \le n$, let $R_i$ be the ith regular expression. A target document on which regular expressions are to be executed is D. Characters which (after canonicalization) are useful in key terms are aggregated and combined into the set $S_i$. $S_i$ includes groups of terms Each generated $S_i$ is grouped into T (e.g. $T=\{S_i|0 \le i \le n\}$). If the regular expression could not be parsed, or resulted in too many terms, $S_i$ is empty (meaning $R_i$ would always be executed).

When executing on a document, all terms within a document D are searched (e.g. any member of any of the groups S) using a searching algorithm such as Aho-Corasick, which can match any of the terms in T in one pass (e.g. can find the set of all terms in any $S_i$ which occurred in D). $R_i$ may match if $S_i$ matches, and never matches if $S_i$ does not match. $S_i$ matches if any group of terms g under it matches or it is empty. "g" matches if each of the terms in g occurred in D.

When $S_i$ did not match, the regular expression did not match. This may occur in many scenarios (for regular expressions detecting credit cards, for example, most documents do not contain credit cards, and so the regular expressions will usually not match). When $S_i$ does match, one of the following may happen: 1) The regular expression was fully processed while extracting key terms. Then $R_i$ matched if and only if $S_i$ matched, 2) The regular expression was partially processed, start and end lengths are known. Then, searches may be performed within a constrained range within D for Or 3) The regular expression was partially processed, and start and end lengths are not known. Then $R_i$ on D will be run. If $S_i$ was empty (couldn't be generated), $R_i$ is executed on D. Thus, $R_i$ is conditionally executed through use of $S_i$.

Performance gains may be significant for parsed regular expressions. "n" regular expressions run on a document of length m in O(n*m) time, while n (successfully preprocessed) conditional regular expressions can run in O(m) time (in the case where either the regular expressions were fully processed, or did not match the document). For many cases, like data leakage protection and anti-spam, most regular expressions do not match any given document, and thus processing for many regular expressions may be avoided.

Canonicalization, as mentioned above, is the process of converting a set of characters to a single character during document processing. The choice of which characters to canonicalize may vary heavily based on implementation. The conversion may be performed both while processing the regular expression (at which point a match of any character in the set instead matches the single character), and while searching for terms within the document (at which point any character in the set is converted). This process can broaden the number of regular expressions which can be successfully converted into conditional regular expressions. Moreover, the preprocessed regular expressions can be executed significantly faster than normal regular expressions.

In some cases, data leakage protection regular expressions are very heavily number oriented. Canonicalizing based on numbers can significantly increase the number of regular expressions which can be preprocessed. For instance, when reading a document, any Arabic number (0 through 9) might be treated as a 0. When this is done, it collapses the number of terms needed to match a regular expression substantially. For instance, [0-9]{3} generates a large number of terms before canonicalization (and a primitive regular expression to match social security numbers, like [0-9]{3}-[0-9]{2}-[0-9]{4}, generates many more). After canonicalization, these become 000 and 000-00-0000, respectively. As most documents do not have such strings of numbers, most regular expressions searching for such strings do not match any given document.

Other examples of where term canonicalization may be useful include numbers, consecutive whitespace characters, languages (Unicode code blocks), alphabetical characters (for example a-z), symbols (canonicalize common textual symbols, like $%^), case (make everything lowercase), or any well-defined set of characters (e.g. abcdef may map to 0, for regular expressions where finding hexadecimal numbers is important). Terms that use canonicalization may not fully parse regular expressions; thus, if the term set matches, Ri will need to be executed.

Extracting terms from the regular expressions happens by processing the regular expression itself. When a character is encountered which is matchable within a relatively small set of characters (the size of this may be customizable) (for example, [0-9] can be any of 10 possibilities, in an ASCII regular expression, \w can be 26 or 52 (depending on if the match is case insensitive), and in a Unicode regular expression, \w can be several thousand characters. Consecutive matchable characters may be aggregated into a set of terms, until an item which cannot be added into a term is encountered (for example, \w*). The next matchable character begins a new set of terms. Grouping operators also cause term-sets to be grouped.

Groups are first processed individually, and then merged into the higher-level results. In processing "a(b(c|d)){2}": "(c|d)" would be processed (producing {'c', 'd'}), then "(b|(c|d))" would be processed (producing {'bc', 'bd'}) and finally, the top level group would be processed, producing a final result of {'abcbc', 'abcbd', 'abdbc', 'abdbd'}.

Once parsing is complete, a list of sets of terms is produced. Each set is then combined—if the number of terms becomes too large at any point, then the set is discarded. The combined sets are placed into groups (with another discard step when there are too many possibilities). The resultant set of groups of terms form $S_i$. The examples below provide indications of how this is done.

EXAMPLE 1A

Canonicalization: none, Regular expression: This example.*text. After processing this, we find the following term-sets: 'This', 'example', 'text'. These are combined into a single group {'This', 'example', 'text'}. The start and end points of this regular expression are known ('this' and 'text'), and so if $S_i$ matches, $R_i$ the regular expression can be run with a predefined start and ending point which is a subset of D (from the start of where 'this' was matched, to the end of where 'text' was matched).

EXAMPLE 1B

Canonicalization: lowercase, Regular expression: The example.*text. After processing this, the following term-sets are found: 'the', 'example', 'text'. There are combined into a single group {'the', 'example', 'text'}. The start and end points of this regular expression are known ('the' and 'text'), and so if $S_i$ matches, $R_i$ can be run with a predefined start and ending point which is a subset of D.

EXAMPLE 2A

Canonicalization: none, Regular expression: where (is|are) the (people|person). After processing this, the following term-sets are found: 'where', {'is', 'are'}, 'the', {'people', 'person'}. These are combined and joined to form four terms: "where is the people", "where is the person", "where are the people", "where are the person". The regular expression was fully converted to terms. As such, the regular expression does not need to be executed, since the regular expression matched if and only if one of the terms matched.

EXAMPLE 2B

Canonicalization: lowercase, Regular expression: where ([Ii]s|are) the ([Pp]eople|[Pp]ersons?). After processing this, the following term-sets are found: 'where', {'is', 'are'}, 'the', {'people', 'person', 'persons'}. These are combined and joined to form six terms: "where is the people", "where is the person", "where is the persons", "where are the people", "where are the person", "where are the persons". The regular expression was fully converted to terms, but because of the canonicalization, this is not sufficient to ensure the regular expression matched. The regular expression needs to be executed to check if a match exists, but has given start and end points.

EXAMPLE 2C

Canonicalization: numbers, Regular expression: \w* who (will (go|\d)|\d{2})\w* test. The deepest group (go|\d) is analyzed to produce 'go' and '0', the next group up is analyzed to produce {'will', {'go', '0'}}, '00'}. Finally, the top level group is analyzed. The \w* is ignored as no terms can be built out of it. Once terms are combined, the following groups are produced: {'who will go', 'test'}, {'who will 0', 'test'}, and {'who 00', 'test'}. The regular expression was not fully converted to terms, and the start point is not known. Thus, if the terms match, the regular expression would need to be run on the entire document to verify a match.

EXAMPLE 3

Canonicalization: none, Regular expression: (\w+\s+){3}\w+. The regular expression matches any four consecutive words, but none of this regular expression is able to be analyzed, and so no terms are produced. In this example, the regular expression needs to be executed to check for a match.

EXAMPLE 4

Canonicalization: none, Regular expression: "\w*\s*Some Text.*(?!invalid).*" where positive key terms include {"Some Text"} and negative key terms include {"invalid"}. Negative key terms, as used herein, include terms that, if found, mean that the regular expression cannot match. Thus, in this example, if the term "invalid" is found in the text, the regular expression will not match. These and other concepts will be explained in greater detail below with regard to methods 200 and 300 of FIGS. 2 and 3, respectively.

Figure 2:
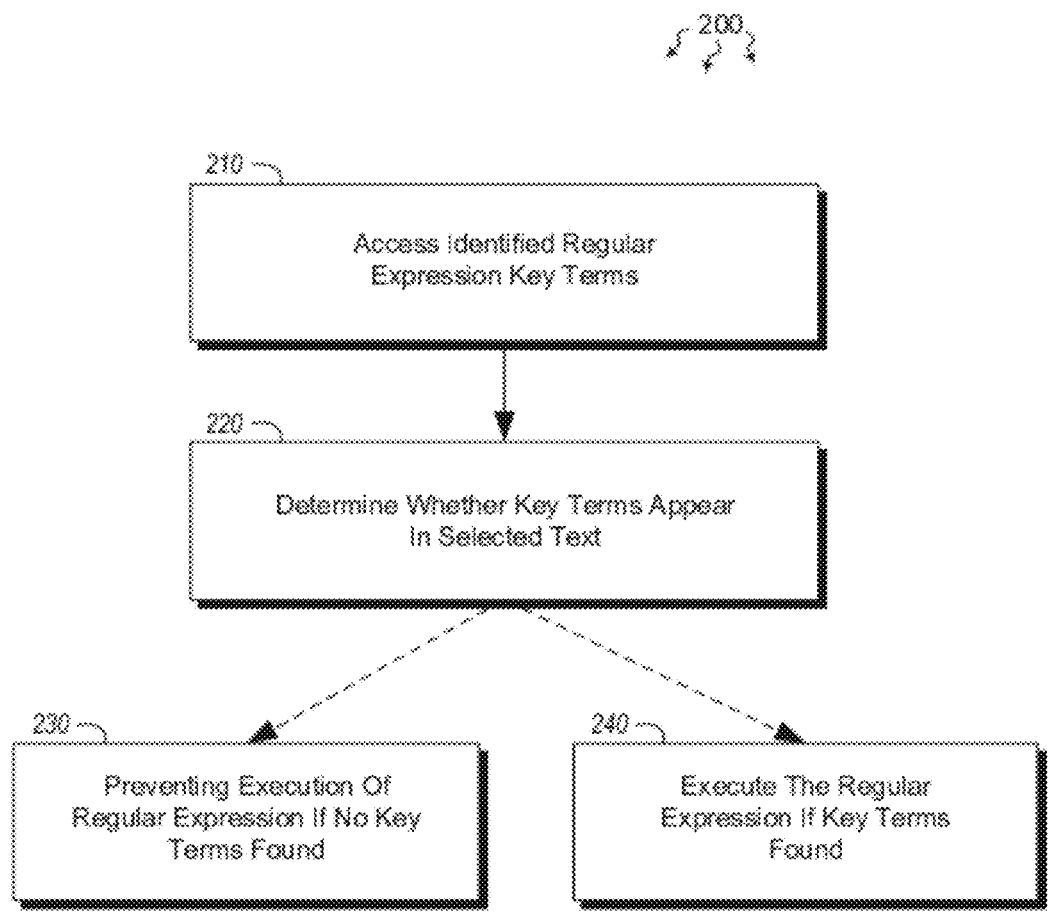
FIG. 2 illustrates a flowchart of an example method for conditionally executing regular expressions.
Figure 3:
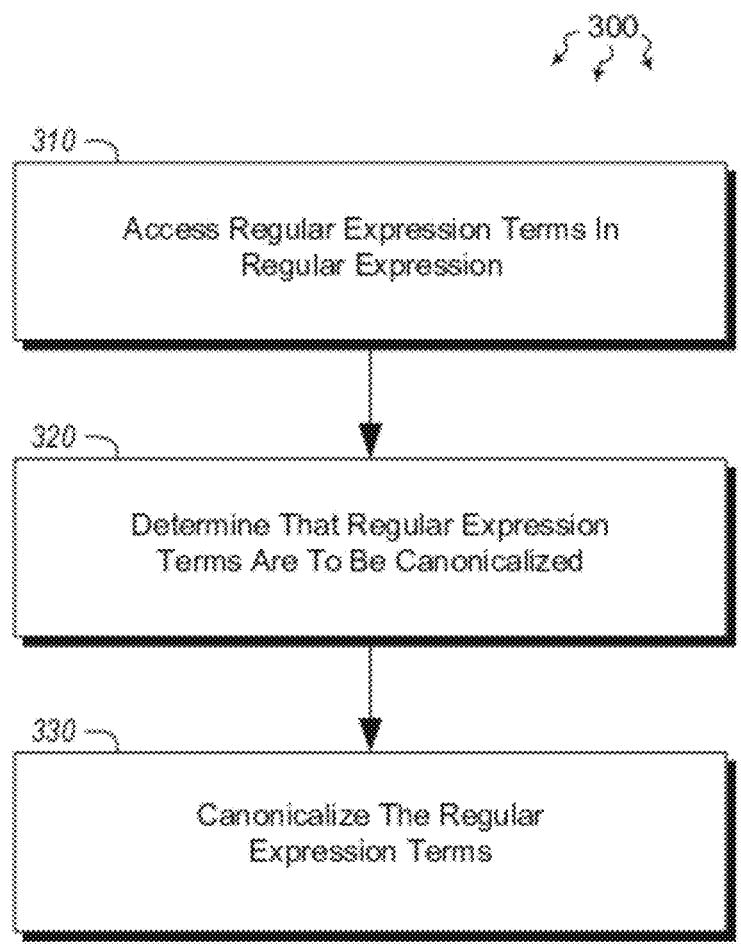
FIG. 3 illustrates a flowchart of an example method for simplifying regular expressions by canonicalizing regular expression terms.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for conditionally executing regular expressions. The method 200 will now be described with frequent reference to the components and data of environments 100 and 400 of FIGS. 1 and 4, respectively.

Method 200 includes an act of accessing one or more identified regular expression key terms that are to appear in a selected portion of text, wherein the regular expression key terms are identified from terms in a selected regular expression (act 210). For example, key term evaluating module 115 may access regular expression key terms 111 that are to appear in a selected portion of text (e.g. text 116). The regular expression key terms 111 may be identified by key terms identifying module 110. The regular expression from which the key terms may be identified (e.g. regular expression 105) may include multiple different regular expression terms and regular expression special characters. The key terms may include fundamental terms that, without which, prevent the regular expression from being matched to the selected portion of text. Accordingly, as explained above, if the key terms of the regular expression are not found in the document, then the rest of the regular expression does not need to be executed, as the key terms must be present in the document for a match to occur.

In some cases, identifying regular expression key terms may include parsing only a portion of the regular expression 105 to identify the regular expression key terms 111, without parsing the entire regular expression. This may save processing resources by avoiding parsing the entire regular expression. Additionally or alternatively, identifying regular expression key terms may include identifying a group of key terms that, without each key term in the group, prevents the regular expression from being matched to the selected portion of text. In other cases involving groups of terms, if any key term in the group of key terms is matched to the selected portion of text, the match may cause the regular expression to be executed. In such cases, policy may determine matching with groups of terms.

Method 200 includes an act of determining whether the one or more identified regular expression key terms appear in the selected portion of text (act 220). For example, key term evaluating module 115 may determine whether one or more regular expression key terms 111 appears in the text portion 116. In some cases, the identified key terms may be identified without parsing the entire regular expression. In such cases, the regular expression 105 may be executed using a bounded execution. A bounded execution may execute only portions of the regular expression, based on where the key terms were identified in the regular expression. Data such as metadata may be stored, identifying where in the regular expression each key term was found. Based on this information, regular expression execution module 120 may perform a bounded execution on the regular expression. During such a bounded execution, the execution may start and stop based on where in the regular expression the key terms were found.

In some embodiments, regular expression terms may be canonicalized in the regular expression. As explained above, canonicalizing may reduce the number of terms in the regular expression by converting certain a set of characters to a single character during the processing of a document. In some cases, a user may be able to specify which characters are to be canonicalized in given portion of text or perform other regular expression optimizations.

Method 200 includes, upon determining that none of the identified regular expression key terms appears in the selected portion of text, an act of preventing execution of the regular expression (act 230). For example, if none of the regular expression key terms 111 appears in the selected portion of text 116, regular expression execution module 120 may prevent execution of the regular expression. On the other hand, if one or more of the regular expression key terms does appear in the text, execution module 120 may execute the regular expression as planned (act 240). In this manner, execution of a regular expression with no matching key terms may be avoided. Moreover, when key terms do match, the regular expression may be executed as it normally would be.

FIG. 3 illustrates a flowchart of a method 300 for canonicalizing regular expression terms. The method 300 will now be described with frequent reference to the components and data of environments 100 and 400 of FIGS. 1 and 4, respectively.

Method 300 includes an act of accessing one or more regular expression terms in a regular expression, the regular expression being configured for finding desired characters sets in a document (act 310). For example, canonicalization module 435 may access regular expression terms in regular expression 105. In some cases, a user may indicate which regular expression terms are to be canonicalized (e.g. in indication 430). Additionally or alternatively, a software program or other entity may determine which regular expression terms are to be canonicalized for a given regular expression.

Method 300 includes an act of determining that one or more of the regular expression terms are to be canonicalized (act 320). For example, canonicalization module 435 (or another user or software program) may determine that certain regular expression terms are to be canonicalized, or converted from a set of terms to a single term.

Method 300 includes, based on the determination, an act of canonicalizing the regular expression terms, such that at least one previously uncanonicalized regular expression term is simplified into a single, canonicalized term (act 330). Thus, canonicalization module 435 may canonicalize the specified regular expression terms (as specified in indication 430) so that at least one previously uncanonicalized regular expression term is simplified into a single, canonicalized term. The resulting text with canonicalized characters 436 may be sent to key term evaluating module 415 to evaluate key terms in the regular expression and/or may be sent to regular expression execution module 420 for execution of the regular expression that includes the canonicalized terms.

In some cases, the regular expression terms may be canonicalized while the regular expression terms are being identified as key terms. Moreover, in some cases, the regular expression terms may be canonicalized while canonicalized terms are being searched for in the associated text (i.e. in text 416).

Thereafter, upon determining that at least one of the searched for canonicalized terms was found in the associated text, the full regular expression may be executed.

Accordingly, systems, methods and computer program products are provided which conditionally execute regular expressions. Moreover, systems, methods and computer program products are provided which simplify regular expressions by canonicalizing regular expression terms.

Regular Expression Transformation

As previously described with reference to FIG. 1, the key terms identifying module 110 may utilize a regular expression expansion algorithm to extract regular expression key terms 111 from a regular expression 105. Processing of the regular expression 105 may range from a state of no processing of the regular expression 105 at all (e.g., no expansion) to a state of fully processing the regular expression 105 so that every potential combination of terms that match the regular expression 105 has been generated as a regular expression key term 111. In addition, there may be any number any number of partial processing states of the regular expression 105 in-between an unprocessed state and a fully processed state as desired for a given implementation.

The key terms identifying module 110 may be arranged for execution on a processor, such as a processor circuit, to generate a set of one or more regular expression key terms 111 from various enabled features of a regular expression 105 based on a set of configuration parameters. The regular expression key terms 111 may be suited for any number of use scenarios, such as an anti-spam filter arranged to filter one or more electronic messages (e.g., email messages) using the set of regular expression key terms 111. The use of regular expression key terms 111, which are typically an array of strings, is much more efficient to filter electronic messages relative to applying hundreds if not thousands of potentially very complex regular expressions 105 to each electronic message.

Figure 5:
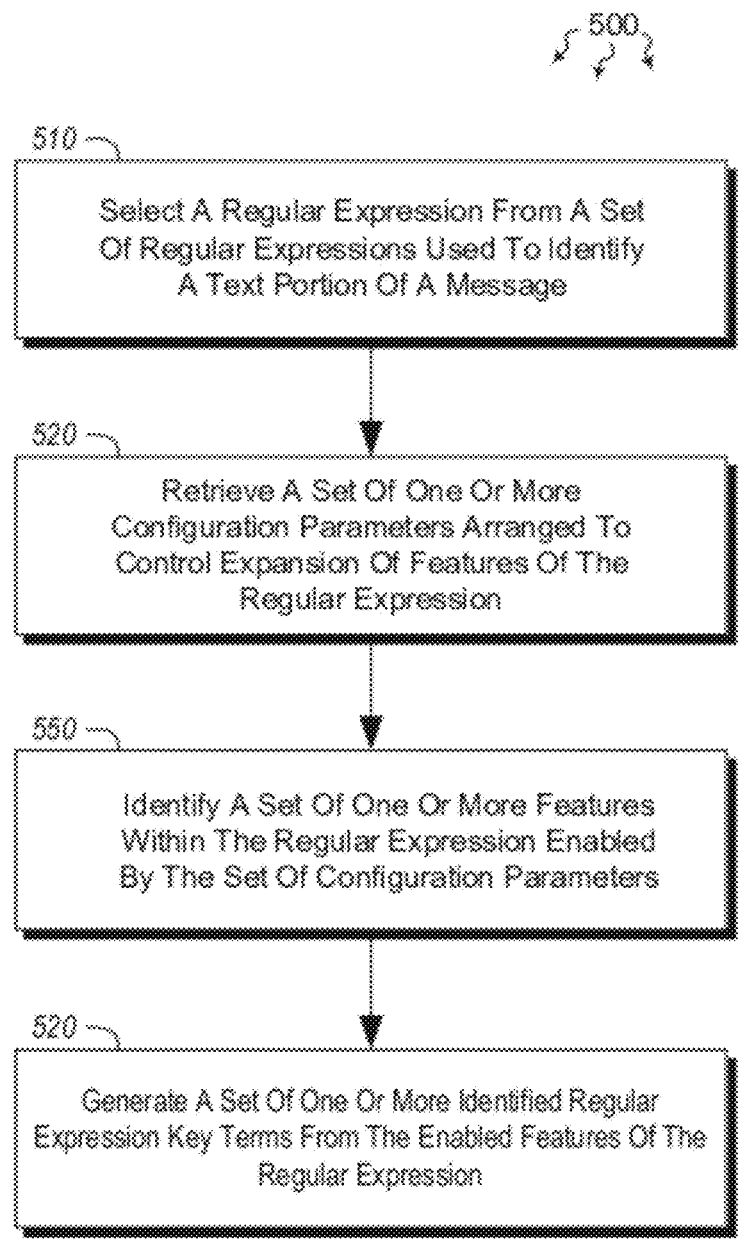
FIG. 5 illustrates a flowchart of an example method for automatically generating regular expression key terms from a regular expression.

FIG. 5 illustrates a flowchart of an example method 500 for automatically generating regular expression key terms from a regular expression. As shown in FIG. 5, method 500 may select a regular expression from a set of regular expressions used to identify a text portion of a message at block 502. For instance, the key terms identifying module 110 may select a regular expression 105 from a set of regular expressions used to identify a text portion 116 of an electronic message, such as an email message, chat message, instant message, short messaging service (SMS) message, a multimedia messaging service (MMS) message, a social networking system (SNS) message, a speech-to-text (STT) message, and other types of messages. The text portion 116 may comprise any portion of an electronic message comprising text information, including one or more fields, body, routing information, metadata, and so forth.

Method 500 may retrieve a set of one or more configuration parameters arranged to control expansion of features of the regular expression at block 504. For example, the key terms identifying module 110 may retrieve a set of one or more configuration parameters from a configuration profile, with each configuration parameter 504 arranged to control expansion of one or more features of the selected regular expression 105.

A feature of a regular expression 105 may comprise a defined syntactical element of a regular expression 105. As previously described, a regular expression 105 provides a concise and flexible means for matching (e.g., specifying and recognizing) strings of text, such as particular characters, words or patterns of characters. Depending on a particular type of regular expression, a regular expression 105 may follow a defined syntax, such as use of Boolean operators such as a vertical bar (e.g., "gray|grey") to separate alternatives, grouping operators such as parentheses to define scope and precedence of operators (e.g., "gr(a|e)y"), quantification operators such as a quantifier for repeating elements (e.g., a "?" to indicate zero or one of a preceding element), and so forth. A grouping is a collection of regular expression terms, which can be extended by using alternation or repetition operators. A repetition operator defines a set of constraints on how many subsequent matches of an expression need to be made. For example, "a?" states that the character "a" should occur between 0 and 1 times. These and other constructions are features that can be combined to form arbitrarily complex expressions. Examples of features may include without limitation normal characters (e.g., letters, numbers, etc.), special characters, meta characters, operators, delimiters, terms, groups, classes, variables, and so forth. Other features exist, and the embodiments are not limited to these examples.

The configuration parameters may be defined to control performance of the regular expression expansion algorithm when expanding out a regular expression 105 into one or more regular expression key terms 111 for a given application. A regular expression 105 may have varying levels of complexity, which in some cases can generate a relatively large number of regular expression key terms 111 when fully processed. The configuration parameters may constrain expansion operations to accommodate regular expressions 105 of varying levels of complexity for a given application. For instance, a regular expression 105 may potentially generate thousands of regular expression key terms 111, which may consume more resources in terms of storage and compute cycles than use of the regular expression 105 itself. The configuration parameters can comprise integer values placing limits on a particular feature for a regular expression 105, thereby providing a fine level of control and granularity for the regular expression expansion algorithm.

In various embodiments, the key terms identifying module 110 may retrieve a configuration parameter comprising an integer value to constrain expansion of a feature of a regular expression 105. In one embodiment, an integer value of zero may indicate that the feature should not be expanded. In one embodiment, an integer value of greater than zero may indicate a number of occurrences of the feature allowed before limiting expansion. For example, assume a configuration parameter for an alternation feature is stored in a configuration profile in the following format:

<FeatureName="Alternation"value="3"/>

As previously described, an alternation applies an operand to a grouping of regular expressions until a match is made or until no further conditions applies. In this case, if a regular expression 105 has an alternation that occurs greater than three (3) times, the regular expression expansion algorithm will not attempt to expand that feature for the regular expression 105. Such constraints may be needed since any feature detected within a regular expression 105 may result in $2^n$ new keyword phrases, with the exception of features using repetition operators of greater than one (1).

Method 500 may identify a set of one or more features within the regular expression enabled by the set of configuration parameters at block 506. For instance, the key terms identifying module 110 may identify a set of one or more features within the regular expression 105 enabled by the set of configuration parameters.

In one embodiment, the key terms identifying module 110 may identify a set of one or more features within the regular expression enabled by the set of configuration parameters, the one or more features comprising a grouping feature, a class feature, or an operator feature. A grouping feature represents grouping operators such as parentheses to define scope and precedence of operators (e.g., "gr(a|e)y"). A class feature represents a class or category of characters, such as alphanumeric characters, non-word characters, word boundaries, control characters, digits, non-digits, visible characters, punctuation characters, whitespace characters, non-whitespace characters, uppercase letters, lowercase characters, hexadecimal digits, a short class, and so forth. A short class is a syntax that is a short form of a class of characters. For example, the symbol "\w" represents a class of characters that include "a-z_0-9," the symbol "\d" represents "0-9" and so forth. An operator feature represents an operator denoted as a symbol or function representing a mathematical operation.

Using this exemplary set of feature types, the key terms identifying module 110 may retrieve configuration parameters for each feature type, determine whether a feature type is enabled or disabled, and scan a regular expression 105 to identify a presence of the grouping, class or operator feature within the regular expression 105 as enabled by the set of configuration parameters. When a grouping, class or operator feature is found in the regular expression 105, the key terms identifying module 110 may evaluate the grouping, class or operator feature to determine whether expansion of that feature is permitted or not. In our previous example, a feature such as an alternation with more than 3 terms would not be expanded.

Method 500 may generate a set of one or more identified regular expression key terms from the enabled features of the regular expression based on the set of configuration parameters at block 508. For example, the key terms identifying module 110 may generate a set of one or more identified regular expression key terms 111 from the enabled features of the regular expression 105 based on the set of configuration parameters.

To begin generating the identified regular expression key terms 111, the key terms identifying module 110 may enumerate each of the identified features. Once enumerated, the key terms identifying module 110 may replace each of the identified features with a literal representation to generate the identified regular expression key term 111. The literal representations are stored in a hashed set of strings to avoid duplication.

The key terms identifying module 110 may apply an order of operations to the identified features in the regular expression 105. In one embodiment, an exemplary order of operations may comprise: (1) single characters followed by a repetition operator; (2) groupings followed by a repetition operator; and (3) groupings with alternations. If any groupings with no operands exist, the key terms identifying module 110 may remove the grouping syntax. The key terms identifying module 110 may convert any short classes without a repetition operator to literal representations.

Figure 6:
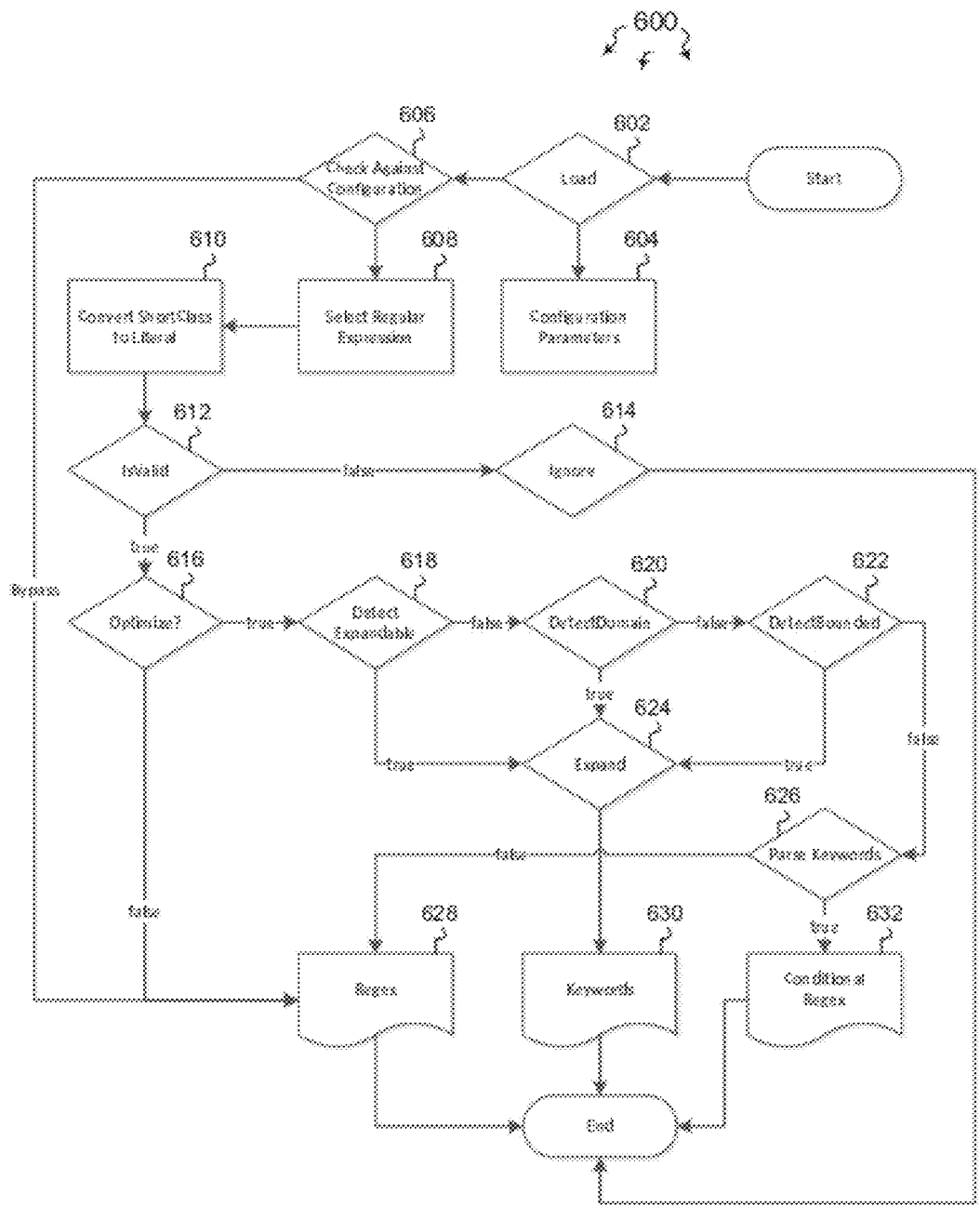
FIG. 6 illustrates a flowchart of an example method for automatically generating regular expression key terms from a regular expression using configuration parameters.

FIG. 6 illustrates a flowchart of an example method 600 for automatically generating regular expression key terms from a regular expression using configuration parameters. Method 600 may be representative of operations of the key terms identifying module 110 when implementing the regular expression expansion algorithm as executed by a processor component (e.g., a processor circuit) of an electronic device (e.g., a desktop computer, a laptop computer, a tablet computer, a smart phone, or other device).

As shown in method 600, relevant software components are loaded at diamond 602. For instance, a configuration profile with a set of one or more configuration parameters 604 is loaded into memory at block 602 in preparation of executing the regular expression expansion algorithm. The set of one or more configuration parameters 604 may be arranged to control expansion of certain defined features of a regular expression 105. Further, the regular expression expansion algorithm is loaded into memory at block 602, and execution of the regular expression expansion algorithm begins at block 606.

Method 600 may check constraints implemented by the configuration parameters 604 at diamond 606. For instance, the key terms identifying module 110 may retrieve a set of one or more configuration parameters 604 arranged to control expansion of features of for a set of regular expressions to determine which features of the regular expressions can be expanded or not. Some constraints may cause a bypass or "short circuit" in the regular expression expansion algorithm resulting in passing one or more regular expressions 105 on without any transformations, as indicated by regular expression 628. Assuming the configuration parameters 604 do not indicate a bypass state, control is passed to block 608.

Method 600 may select a regular expression from a set of regular expressions used to identify a text portion of a message at block 608. For instance, the key terms identifying module 110 may select a regular expression 105 from a set of regular expressions used to identify a text portion 116 of an electronic message, such as an email message, chat message, instant message, short messaging service (SMS) message, a multimedia messaging service (MMS) message, a social networking system (SNS) message, a speech-to-text (STT) message, and other types of messages.

Method 600 may convert any short classes to literal expressions at block 610. For instance, the key terms identifying module 110 may convert regular expression short classes to literal representations, such as converting a "\s" and "\x20" to a literal space. Further, the key terms identifying module 110 may perform "unescaping" operations for special characters at this point. For instance, the key terms identifying module 110 may convert "hello\ !" into "hello!". Any special characters that are escaped are meant to target the literal value.

Method 600 may attempt to validate the regular expression 105 at diamond 612. For instance, the key terms identifying module 110 may validate the regular expression 105 by passing it into a .NET regular expression object. If there are any syntax issues, an exception is thrown and the regular expression object will not be created. If the regular expression 105 does not pass validation then the regular expression is ignored at diamond 614 and the regular expression expansion algorithm skips to the end.

Once the regular expression 105 is validated at diamond 612, method 600 may check a configuration parameter 604 to determine whether to expand or optimize the regular expression 105. If the configuration parameter 604 is set to TRUE, the regular expression expansion algorithm will attempt to expand (or optimize) the regular expression 105. If the configuration parameter 604 is set to FALSE, the regular expression 105 will remain as is, and the algorithm will end.

When expansion is enabled for the regular expression 105, method 600 may attempt to detect whether the regular expression 618 is expandable at diamond 618. For example, the key terms identifying module 110 may analyze the regular expression 105 to make an initial determination as to whether it is a good candidate for producing regular expression key terms 111 from the regular expression 105 prior to attempting to perform expansion operations. For instance, when the regular expression 105 is composed of only special characters, without any normal characters (e.g., "a-z0-9"), it is likely not a good candidate for expansion.

When the regular expression 105 is not initially determined to be a good candidate for expansion at diamond 618, method 600 may analyze the regular expression 105 to detect whether it is intended to target specific domains or uniform resource locators (URLs) at diamond 620.

When the regular expression 105 is not intended for a specific domain at diamond 620, method 600 may analyze the regular expression 105 to determine if a word boundary (e.g., "\b") is leading or following or both at diamond 622. If TRUE, the key terms identifying module 110 may convert the word boundary into a feature within another external application, such as a spam engine for a messaging application, for example.

If FALSE at diamond 622, the key terms identifying module 110 may attempt to parse keywords for a conditional regular expression as previously described with reference to FIGS. 1-4 at diamond 626. If keywords are parsed at diamond 626, method 600 produces a conditional regular expression 632 derived from the regular expression 105. If no keywords are parsed at diamond 626, method 600 passes the regular expression 105 on as regular expression 628.

If any of the tests for diamonds 618, 620 or 622 are TRUE, method 600 initiates expansion operations for the regular expression 105 at diamond 624. The key terms identifying module 110 may perform expansion operations using a defined order of operations, such as optional single characters, optional groupings, groupings with alternation, redundant non-capture groupings, and so forth.

In one embodiment, for example, method 600 may perform various expansion operations at diamond 624 by first extracting single characters with repetition operators from the regular expression 105. Method 600 may next extract groupings with repetition operators from the regular expression 105. Method 600 may then extract groupings with alternations from the regular expression 105. Finally, method 600 may remove redundant groupings from the regular expression 105. Each of these operations may be demonstrated using the various expansion scenarios detailed below.

A first expansion scenario provides an example of a regular expression 105 having a single character with a repetition operator. Assume the key terms identifying module 110 receives a regular expression 105 as follows:

"buy?(?:from)?our store"

This example contains the following features: (1) an optional character; and (2) an optional grouping. Assuming configuration parameters enable expansion of these two features, the key terms identifying module 110 may use the previously defined order of operations to expand out the single character by splitting it into two new string values: (1) "buy (?:from)? our store"; and (2) "bu (?:from)? our store". The key terms identifying module 110 then expands out the optional grouping by splitting into four new strings: (1) "buy from our store"; (2) "bu from our store"; (3) "buy our store"; and (4) "bu our store". An array of four new strings may be stored as identified regular expression key terms 111 in a data store for the regular expression 105. It is worthy to note that in this example, there are no redundant groupings to remove, and further, there are no short classes or syntax in the example to convert.

A second expansion scenario provides an example of a regular expression 105 having an alternation with a repetition operator. Assume the key terms identifying module 110 receives a regular expression 105 as follows:

"buy(?:(?:any|every)thing)?from our store"

This example contains the following features: (1) an optional grouping that is non-capturing "(?:(?:any|every)thing)?"; and (2) a grouping with an alternation that is non-capturing "(?:any|every)". Note there are no single characters or short classes in this example. Assuming configuration parameters enable expansion of these two features, the key terms identifying module 110 may use the previously defined order of operations to expand out the repetition grouping by splitting it into two new string values since the operator is a "?": (1) "buy from our store"; and (2) "buy (?:(?:any|every)thing) from our store". The key terms identifying module 110 may expand out the remaining alternation as follows: (1) "buy (?:anything) from our store"; and (2) "buy (?:everything) from our store". The key terms identifying module 110 may then remove any groupings that do not have an operand (e.g., a redundant grouping). There are three strings as a result of the previous expansion operation, including: (1) "buy from our store"; (2) "buy (?:anything) from our store"; and (3) "buy (?:everything) from our store". Note there are two redundant groupings of "(?anything)" and "(?everything)" that are artifacts from the expansion. The key terms identifying module 110 may remove the redundant grouping syntax to produce the following strings: (1) "buy from our store"; (2) "buy anything from our store"; and (3) "buy everything from our store". An array of three new strings may be stored as identified regular expression key terms 111 in a data store for the regular expression 105. The key terms identifying module 110 may stop processing the regular expression 105 at this point since there are no short classes or syntax in the example to convert.

A third expansion scenario provides an example of a regular expression 105 having a short class. Assume the key terms identifying module 110 receives a regular expression 105 as follows:

"\bbuy\sfrom\sour\sstore"

This example contains the following features: (1) a word boundary denoted by "\b"; and (2) a short class denoted by "\s". A word boundary is a character that is not "a-z0-9" that is followed or preceded by a character that is "a-z0-9". Note this example does not contain any single characters, groupings with repetition operators, groupings with alternations, or redundant groupings. Assuming configuration parameters enable expansion of these two features, the key terms identifying module 110 may use the previously defined order of operations to convert any short classes to literal values, which includes: (1) convert "\s" to a literal space such as "\bbuy from our store"; and (2) convert "\b" to a word boundary feature defined by another application, such as a spam filter, for example.

A fourth expansion scenario provides an example of a regular expression 105 having a conditional regular expression. Assume the key terms identifying module 110 receives a regular expression 105 as follows:

"hello.*world\!"

Special characters are escaped to indicate a literal match. In parsing keyword patterns, escaped characters are identified and include them in keyword parsing operations. This example contains a wildcard feature with a repetition operator for zero (0) to any number of iterations. The regular expression expansion algorithm executed by the key terms identifying module 110 immediately detects the special characters ".*" and does not attempt to expand the wildcard feature. The key terms identifying module 110 attempts to extract keyword values and build a conditional regular expression. For instance, the key terms identifying module 110 may parse for characters until a regular expression syntax character is detected, which in this case is ".". The term that is parsed is "hello". The key terms identifying module 110 then parses for characters after the regular expression syntax until the end of the string or until other regular expression syntax characters are found. In this example the key term parsed is "world!". The key terms identifying module 110 generates a conditional regular expression rule using the found key terms. Thus, if either of the terms "hello" or "world!" are present within the text portion 116 of an electronic message (e.g., email message), then the key terms identifying module 110 executes the regular expression 105, otherwise the key terms identifying module 110 does not execute the regular expression 105.

A fifth expansion scenario provides an example of a regular expression 105 having a conditional regular expression with a grouping feature commonly referred to as a "lookaround." A lookaround is a grouping that asserts or rejects a term at a position within the regular expression 105. A lookaround can be negative or positive and can assert or reject text values in front of a current position or behind the current position. For example, "out of (?!office)" will match any text containing the term "out of" except when followed by the term "office", which is described in more detail below. This type of lookahead is referred to as a negative lookahead.

By way of further example, assume the key terms identifying module 110 receives a regular expression 105 as follows:

"out of(?!office)"

This example contains a negative lookahead (NLA) grouping feature, and a corresponding configuration parameter 604 that indicates any NLA grouping features are disabled. The key terms identifying module 110 may attempt to extract keyword values by parsing for characters until some regular expression syntax is detected, which in this case results in the key term "out of". The key terms identifying module 110 identifies "(?!office)" as a NLA grouping feature, and therefore does not extract out a key term "office" based on the associated configuration parameter. The key terms identifying module 110 will not execute the regular expression 105 against an electronic message unless the phrase "out of" is present in a text portion 116 of the electronic message.

Figure 7:
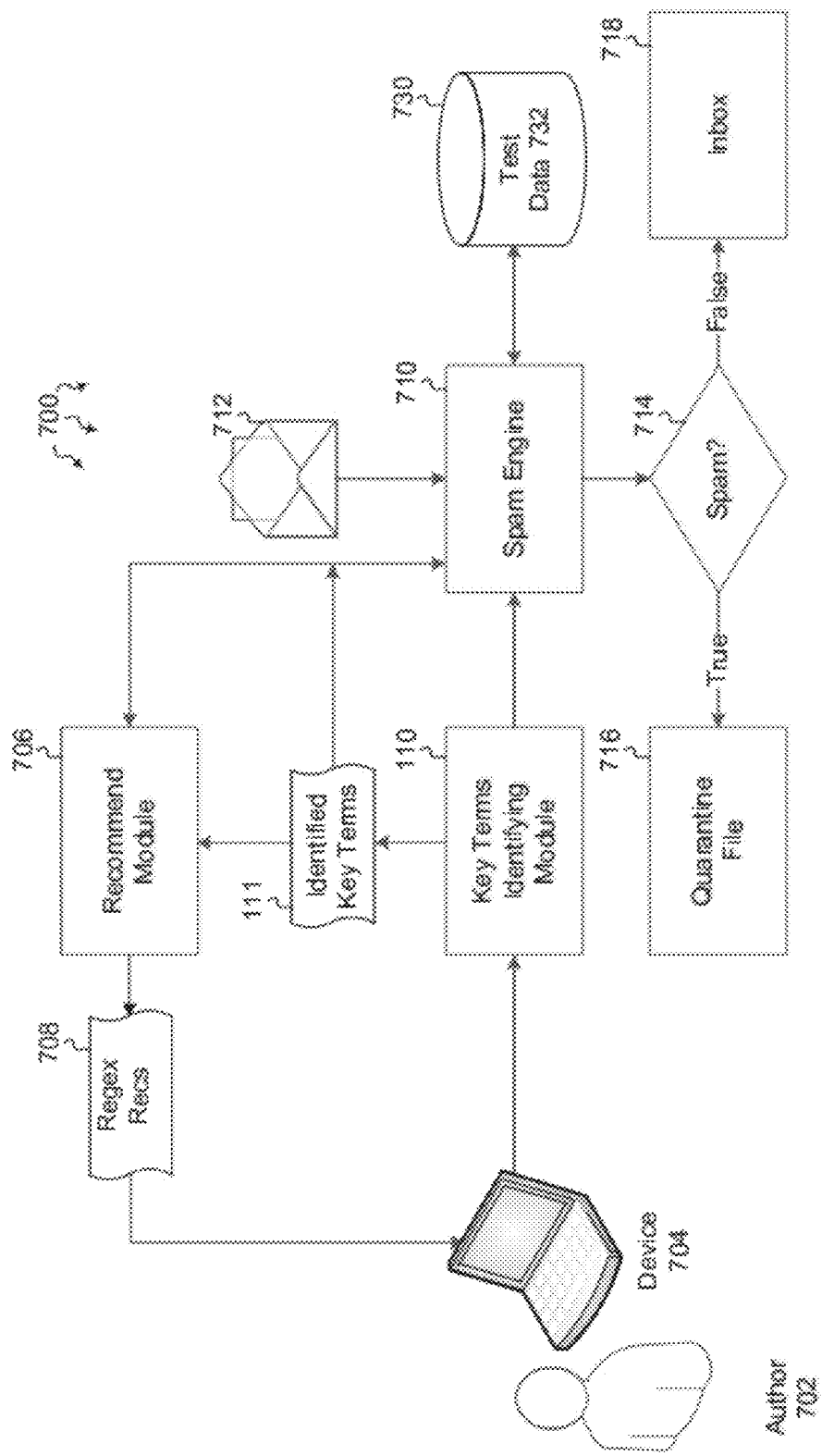
FIG. 7 illustrates a computer architecture in which embodiments may operate including automatically provide recommendations to modify a regular expression based on a set of regular expression key terms.

FIG. 7 illustrates a computer architecture 700 in which embodiments may operate including automatically provide recommendations to modify a regular expression based on a set of regular expression key terms.

Regular expressions 105 can be syntactically complex and require expertise to craft. Often, when presented with a regular expression, it takes time and understanding to determine what phrases are targeted by the rule. As such, regular expressions are typically authored by a team of knowledge engineers specialized in a particular application. For instance, if a particular application is an email messaging application, knowledge engineers intimately familiar with email messaging applications and use scenarios may design regular expressions specifically constructed for email messaging applications. This may include regular expressions designed to identify and filter out unsolicited, malicious, bulk or commercial electronic messages, informally referred to as "spam" messages.

As shown in FIG. 7, a regular expression author 702 may utilize a device 704 (e.g., a desktop computer, a laptop computer, a tablet computer, a smart phone, etc.) to author various regular expressions 105 using various type of regular expression authoring applications (e.g., editors). The regular expression author 702 may enter a draft of a regular expression 105, which the key terms identifying module 110 accepts as input to generate a set of regular expression key terms 111. The key terms identifying module 110 may output the regular expression key terms 111 to a recommend module 706.

The recommend module 706 is arranged to automatically recommend modifications to the regular expression 105 based on the set of regular expression key terms 111 generated by the key terms identifying module 110. At a first level, the recommend module 706 organizes and presents the regular expression key terms 111 to the regular expression author 702. The regular expression author 702 may then evaluate and analyze the regular expression key terms 111 to determine whether they are the intended result of the draft of the regular expression 105, and if not, modify the regular expression 105 accordingly. At a second level, the recommend module 706 may evaluate and analyze the draft of the regular expression 105 based on a set of authoring rules, and automatically generate one or more regular expression recommendations 708 to modify or correct the draft of the regular expression 105 to provide enhanced results. In both cases, the recommend module 706 provides a way for the regular expression author 702 to "debug" a draft of a regular expression 105 based on hard results rather than conjecture as to what potential phrases could be matched.

By way of example of dynamic rule feedback for the regular expression author 702, assume a knowledge engineer (KE) receives a spam complaint from a customer and opens a tool to author a new regular expression 105. The KE submits the regular expression 105 into a regular expression editor via an input device of the device 704, which forwards the regular expression 105 to the key terms identifying module 110. The key terms identifying module 110 executes the regular expression expansion algorithm to generate a set of regular expression key terms 111, which is used as input to the recommend module 706. The recommend module 706 generates a regular expression recommendation 708, which is sent to the regular expression editor for presentation to the regular expression author 702 via a user interface of an output device (e.g., display) for the device 704. The KE can further modify keywords or other properties of the regular expression 105 based on the surfaced regular expression recommendation 708. For instance, assume the regular expression author 105 submits a regular expression 105 as follows:

"(?:what|this)(?:is)?spam"

Further assume the regular expression 105 produced a few keywords that the regular expression author 702 did not mean to target. For instance, the key terms identifying module 110 may return a set of four regular expression key terms 111 that includes: (1) "what is spam"; (2) "this is spam", (3) "what spam"; and (4) "this spam". In this example, assume the recommend module 706 merely returns the set of four regular expression key terms 111 as a regular expression recommendation 708. Once surfaced by the user interface, the regular expression author 702 discovers that the keyword "this spam" is not intended and it was an unforeseen consequence of the regular expression 105. This is typical since regular expressions can potentially be very complex. This feedback allows the regular expression author 702 to modify the regular expression 105 in a way that avoids producing the term "this spam". Alternatively, the regular expression author 702 may selectively remove the term "this spam" from the set of regular expression key terms 111, thereby reducing the set of four regular expression key terms 111 to three regular expression key terms 111.

Additionally or alternatively to returning a regular expression recommendation 708 comprising the four regular expression key terms 111, the recommend module 706 may automatically return suggestions to modify or correct the regular expression 105 to avoid producing the term "this spam", or eliminating it from the set of regular expression key terms 111.

In either case, the key terms identifying module 110 and the recommend module 706 provides feedback useful for developing or refining regular expressions 105, which otherwise may have gone unnoticed until a false positive was reported from a customer. In this manner, instead of manually adding in hundreds of keywords, the KE can simply write one regular expression 105 to produce the same output within the regular expression authoring tool.

In addition to the regular expression key terms 111, the recommend module 706 may provide regular expression recommendations 708 based on test results from various simulations performed using the regular expression key terms 111. Referring again to FIG. 7, the key terms identifying module 110 may output the regular expression key terms 111 to a spam engine 710 for a messaging application, such as an email application, for example. The spam engine 710 may apply the draft of the regular expression 105 and associated regular expression key terms 111 to a set of test data 732 stored in a data store 730 and/or real electronic messages 712 for a defined test period. The spam engine 710 may determine whether the test data 732 and/or electronic messages 712 are spam at block 714, and either send the messages to a quarantine file 716 or an inbox 718 of the email application. Once the test period expires, the spam engine 710 may send the test results to the recommend module 706 for evaluation and analysis. The recommend module 706 may perform this evaluation and analysis using any known statistical analysis techniques, such as number of messages sent to the quarantine file 716 and/or the inbox 718, a statistical average, a statistical mean, number of known spam messages sent to inbox 718, number of known real messages sent to quarantine file 716, and other studies. The recommend module 706 may then generate a regular expression recommendation 708 based on results of the evaluation and analysis of the test results.

Figure 8:
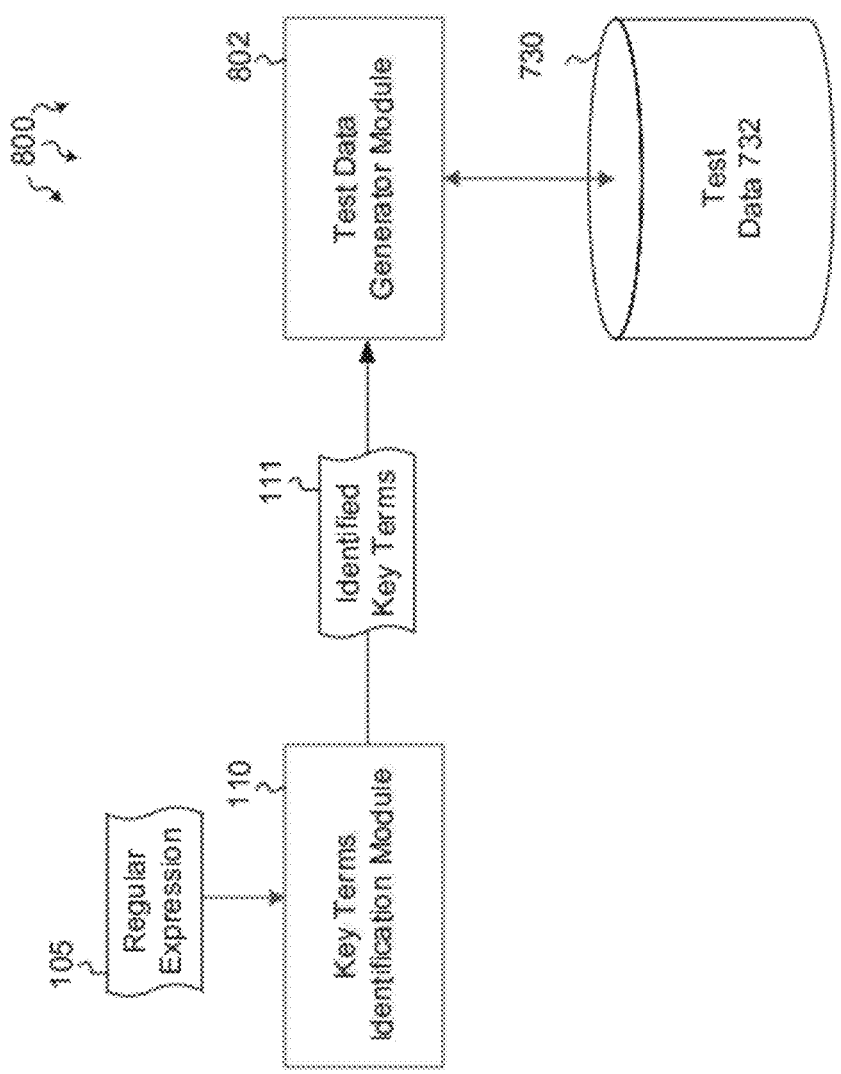
FIG. 8 illustrates a computer architecture in which embodiments may operate including automatically generating test data based on a set of regular expression key terms.

FIG. 8 illustrates a computer architecture 800 in which embodiments may operate including automatically generating test data based on a set of regular expression key terms 111. Testing a spam engine, such as the spam engine 710, is difficult due to certain restrictions of personally identifiable information and access to corpuses of legitimate and spam email. With regular expression key terms 111 generated for a corpus of one or more regular expression 105 by the key terms identifying module 110, the test data 732 (e.g., test emails) can be reconstructed based upon: (1) the keywords automatically parsed out from regular expression rules; and (2) the email target part for which the regular expression rule was intended. This ability facilitates testing performance and throughput of the spam engine 710, and particular rules can be stopped from publishing to production if deemed underperforming.

As shown in FIG. 8, the key terms identification module 110 may receive as input a regular expression 105, and generate a set of one or more regular expression key terms 111. The key terms identification module 110 may output the set of regular expression key terms 111 to a test data generator module 802. The test data generator module 802 may generate a set of test data 732 based on the set of regular expression key terms 111. For instance, the test data generator module 802 may generate a set of test emails having text portions 116 randomly generated utilizing the regular expression key terms 111. Since the regular expression key terms 111 are strings of terms, the test data generator module 802 may generate a certain number of each term and randomly distribute the generated terms according to some statistical distribution technique, such as a discrete probability distribution, for example.

In one embodiment, for example, the test data generator module 802 may dynamically generate a corpus for test purposes. For instance, the key terms identification module 110 may expand one or more regular expressions 105 into regular expression key terms 111, and store the regular expression key terms 111 in a database, such as data store 730. The test data generator module 802 may dynamically construct test data, such as test email messages, using a rule target property. The test data generator module 802 may select a couple of random subject rules and populate a subject field of test email messages based off of the regular expression key terms 111. The test data generator module 802 may select several rules targeted at a body for test email messages and populate the body based on the regular expression key terms 111. This process can be repeated for all desired properties of a test email message. The test data generator module 802 may then generate a corpus of test data 732 with a configurable amount of volume.

Once the test data 732 is generated, a test (or profiling) machine may be loaded with all the regular expressions 105 used to generate the test data 732. An example of a test machine may include the spam engine 710, among others. The test machine runs against the corpus at regular intervals. Any new rules or change to an existing rule can generate an alert event. These alerts can be used as functional tests. Additionally, when making code or design changes to software, this scenario can complement integration and functional testing. This model may also provide a state mechanism that can detect small changes in rule behavior.

Figure 9:
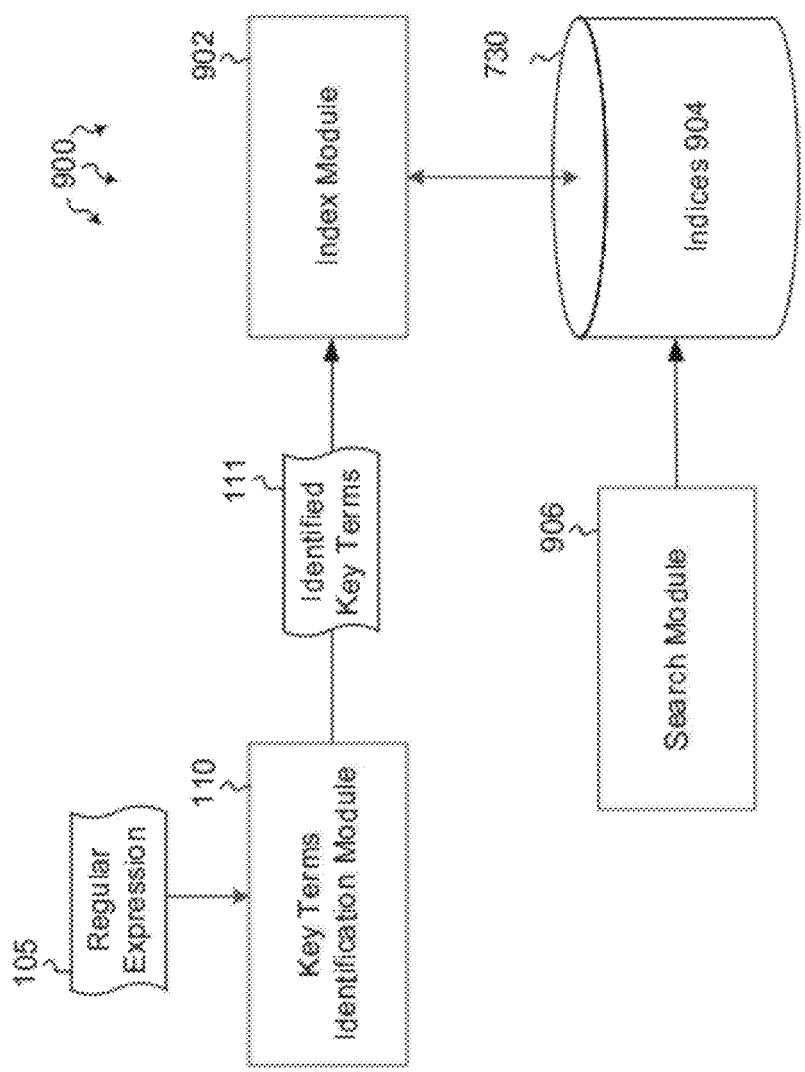
FIG. 9 illustrates a computer architecture in which embodiments may operate including indexing regular expression key terms.

FIG. 9 illustrates a computer architecture 900 in which embodiments may operate including indexing regular expression key terms. Searching through an existing set of regular expression 105 rules for a given application, such as the spam engine 710, to find a particular regular expression 105 is difficult since it is limited to any searchable terms within the regular expression 105 itself. Also, such as search does not produce any hits for the type of phrases covered by the regular expression 105. This makes modifications of rules for a given application particularly slow and burdensome. Current solutions for regular expression searching have low performance (e.g., a SQL regular expression search) as compared with keyword based indexes.

The computer architecture 900 provides a way to enhance searches for particular regular expressions 105 within a set of regular expressions 105, thereby allowing a set of rules for a given application to be refined at a much faster pace. As shown in FIG. 9, the key terms identification module 110 may expand one or more regular expressions 105 into regular expression key terms 111, and output the regular expression key terms 111 to an index module 902. The index module 902 may build one or more searchable indices 904 for the regular expression key terms 111, and store the indices 904 in a database, such as data store 730. An index 904 may comprise a table having a list of regular expressions 105 associated with corresponding regular expression key terms 111. A KE can utilize a search module 906 to search the one or more indices 904 to find a target regular expression 105.

The index module 902 and the search module 906 provide a KE the capability to perform quick and accurate searches based on keywords to find application rules that were previously in regular expression form. The index module 902 and the search module 906 further provide the capability to show rules that have similar keywords, thereby allowing a KE to potentially reduce or remove any redundant rules. The ability to automatically generate text based search indices 904 based on keyword terms (e.g., regular expression key terms 111) extracted from regular expressions 105 provide more accurate results with a high degree of performance The present embodiments may be embodied in other specific forms without departing from its spirit or essential characteristics. The described embodiments are to be considered in all respects only as illustrative and not restrictive. The scope of the embodiments is, therefore, indicated by the appended claims rather than by the foregoing description. All changes which come within the meaning and range of equivalency of the claims are to be embraced within their scope.

We claim:

1. A computer-implemented method, comprising:
   selecting a regular expression from a set of regular expressions used to identify a text portion of a message;
   retrieving a set of one or more configuration parameters arranged to limit expansion of features of the regular expression into a set of potential regular expression key terms, at least one configuration parameter operative to determine which feature to expand and which feature not to expand;
   identifying a set of one or more features within the regular expression enabled by the set of configuration parameters; and
   generating a set of one or more identified regular expression key terms from the enabled features of the regular expression.

2. The computer-implemented method of claim 1, comprising retrieving a configuration parameter comprising an integer value to constrain expansion of a feature of the regular expression.

3. The computer-implemented method of claim 1, comprising retrieving a configuration parameter comprising an integer value to constrain expansion of a feature of the regular expression, where an integer value of zero indicates that the feature should not be expanded.

4. The computer-implemented method of claim 1, comprising retrieving a configuration parameter comprising an integer value to constrain expansion of a feature of the regular expression, where an integer value of greater than zero indicates a number of occurrences of the feature allowed before limiting expansion.

5. The computer-implemented method of claim 1, comprising identifying the set of one or more features within the regular expression enabled by the set of configuration parameters, the one or more features comprising a grouping feature, a class feature, or an operator feature.

6. The computer-implemented method of claim 1, comprising enumerating each of the identified features.

7. The computer-implemented method of claim 1, comprising replacing each of the identified features with a literal representation to generate an identified regular expression key term.

8. The computer-implemented method of claim 1, comprising applying an order of operations to the identified features in the regular expression.

9. The computer-implemented method of claim 1, comprising extracting single characters with repetition operators from the regular expression.

10. The computer-implemented method of claim 1, comprising extracting groupings with repetition operators from the regular expression.

11. The computer-implemented method of claim 1, comprising extracting groupings with alternations from the regular expression.

12. The computer-implemented method of claim 1, comprising remove redundant groupings from the regular expression.

13. The computer-implemented method of claim 1, comprising recommending modifications to the regular expression based on the set of identified regular expression key terms.

14. One or more computer-readable storage media, comprising a memory, having stored thereon computer-executable instructions that, when executed by one or more processors of the computing system, cause a computing system to:
    retrieve a set of one or more configuration parameters arranged to control expansion of features of a regular expression, at least one configuration parameter defining a value to limit expansion of at least one feature into potential regular expression key terms;
    perform the expansion of the features of the regular expression using an order of operations;
    generate a set of one or more regular expression key terms from the features of the regular expression based on the set of configuration parameters; and
    filter electronic messages using the set of regular expression key terms.

15. The one or more computer-readable storage media of claim 14, the computer-executable instructions that cause the computing system to identify a set of one or more features within the regular expression enabled by the set of configuration parameters, the one or more features comprising a grouping feature, a class feature, or an operator feature.

16. The one or more computer-readable storage media of claim 15, the computer-executable instructions that cause the computing system to:
    enumerate each of the identified features; and
    replace each of the identified features with a literal representation comprising a string of terms to generate a regular expression key term from the regular expression.

17. The one or more computer-readable storage media of claim 15, the computer-executable instructions that cause the computing system to apply the order of operations to the identified features in the regular expression, the order of operations comprising single characters with a repetition operator, groupings with a repetition operator, and alternations.

18. An apparatus, comprising:
    a processor circuit, and
    a key terms identifying module operative on the processor circuit to retrieve a set of configuration parameters of which at least one configuration parameter comprises a value to constrain expansion of a feature of the regular expression, where the value indicates when the feature is not to be expanded, generate a set of one or more regular expression key terms from enabled features of a regular expression based on a set of configuration parameters, and filter one or more electronic messages using the set of regular expression key terms.

19. The apparatus of claim 18, the key terms identifying module operative to identify a set of one or more features within the regular expression enabled by the set of configuration parameters, the one or more features comprising a grouping feature, a class feature, or an operator feature.

20. The apparatus of claim 18, the key terms identifying module operative to apply an order of operations to identified features in the regular expression, the order of operations comprising single characters with a repetition operator, groupings with a repetition operator, and alternations.

\* \* \* \* \*